United States Patent
Forbes et al.

(10) Patent No.: US 9,590,860 B2
(45) Date of Patent: Mar. 7, 2017

(54) FIBER OPTIC NETWORK DESIGN METHOD

(71) Applicant: Biarri Networks Pty Ltd, Hendra, Queensland (AU)

(72) Inventors: Christopher Russell Forbes, Moorooka (AU); Paul Michael Kennedy, Eaglemont (AU)

(73) Assignee: BIARRI NETWORKS PTY LTD, Hendra, Queensland (AU)

( * ) Notice: Subject to any disclaimer, the term of this patent is extended or adjusted under 35 U.S.C. 154(b) by 0 days.

(21) Appl. No.: 14/740,775

(22) Filed: Jun. 16, 2015

(65) Prior Publication Data
US 2016/0373309 A1 Dec. 22, 2016

(51) Int. Cl.
*H04J 14/00* (2006.01)
*H04L 12/24* (2006.01)
*H04Q 11/00* (2006.01)

(52) U.S. Cl.
CPC ........ *H04L 41/145* (2013.01); *H04L 41/0826* (2013.01); *H04Q 11/0066* (2013.01); *H04Q 2011/0079* (2013.01)

(58) Field of Classification Search
CPC ... G06F 17/509; G06F 2217/36; H04L 41/145
(Continued)

(56) References Cited

U.S. PATENT DOCUMENTS 7,916,777 B1 * 3/2011 Johnson ............ H04L 12/5691 375/222
9,323,872 B2 * 4/2016 Forbes ................ G06F 17/5009
(Continued)

FOREIGN PATENT DOCUMENTS

GB 2 334 605 3/2003
WO WO 2012/021933 2/2012
(Continued)

OTHER PUBLICATIONS

Extended European Search Report dated Nov. 26, 2015 out of corresponding European Application No. 15172250.1 (9 pages).
(Continued)

*Primary Examiner* — Don N Vo

(74) *Attorney, Agent, or Firm* — Brinks Gilson & Lione; G. Peter Nichols

(57) ABSTRACT

A computer-implemented method and system for designing a fiber optic network for a plurality of premises in a geographic area that has existing infrastructure. The system includes an input module arranged to electronically receive design outputs comprising geographic locations of nodes in the fiber optic network and arcs extending between the nodes, relative to at least elements of existing infrastructure used as geographic locations for the nodes and the arcs, the elements of the existing infrastructure being associated with characterizing data that characterizes the elements of existing infrastructure; the input module is further arranged to electronically receive validation data corresponding to the elements of the existing infrastructure, the validation data being indicative of validity of the characterizing data. The system includes an optimizer arranged to electronically generate new design outputs by optimizing geographic locations of the nodes and the arcs in the fiber optic network.

22 Claims, 8 Drawing Sheets

(58) Field of Classification Search
USPC .......................................................... 398/45
See application file for complete search history.

(56) References Cited

U.S. PATENT DOCUMENTS

| | | | |
|---|---|---|---|
| 9,413,480 B2* | 8/2016 | Zheng | H04J 3/1652 |
| 2006/0126521 A1* | 6/2006 | Hyndman | H04L 41/12 |
| | | | 370/248 |
| 2008/0181609 A1 | 7/2008 | Yi et al. | |
| 2010/0003030 A1 | 1/2010 | Gilfedder et al. | |
| 2011/0191470 A1 | 8/2011 | Pujet et al. | |

FOREIGN PATENT DOCUMENTS

| | | |
|---|---|---|
| WO | WO 2012/061158 | 5/2012 |
| WO | WO 2014/088597 | 6/2014 |

OTHER PUBLICATIONS

U.S. Appl. No. 13/575,342, filed Jul. 8, 2013.
PCT/AU2011/001053 International Search Report dated Oct. 6, 2011 (2 pages).
PCT/AU2011/001053 International Preliminary Report on Patentability dated Jul. 2, 2012 (15 pages).
Article, Hamad et al., "Optimal Power-Aware Design of All-Optical Multicasting in Wavelength Routed Networks", 2004, IEEE Communications Society, pp. 1796-1800.
Article, Stanko, et al., "Implementation of Fiber Optic Cables in Sewage System", 2006, Integrated Urban Water Resources management, pp. 171-180.
Article, Lee et al., "Fiber to the Home Using a PON Infrastructure", IEEE, 2006, Journal of Lightwave Technology, vol. 24, No. 12, pp. 4568-4583.

* cited by examiner

FIBER OPTIC NETWORK DESIGN METHOD

The present invention relates to a method of designing a fiber optic network for a plurality of premises in a geographic area comprising existing infrastructure for utilities in the geographic area.

BACKGROUND

Optical fiber can be used as a medium for telecommunication and networking because it is flexible and can be bundled as cables. It is especially advantageous for long-distance communications because light propagates through the fiber with little attenuation compared with electrical cables. In recent times, vast fiber optic networks have been commissioned to cope with the increasing growth in Internet communication and cable television.

In one existing example, fiber optic networks are designed manually with a view of ensuring that engineering and other physical requirements are met. Not only is this manual design process often laborious and time consuming, but the resulting network design is often far from ideal by including more infrastructure than is absolutely necessary, which ultimately adds to network cost. In addition, manually modifying the designed network to reduce the amount of infrastructure, or in response to changing requirements, is also a laborious and time consuming task.

WO 2012/021933 discloses a system for designing a fiber optic network in an area that has existing infrastructure. The system generates a design by optimizing geographic locations of the nodes and arcs in the fiber optic network using design inputs and existing infrastructure, and outputs a design comprising the optimised geographic locations of the nodes and arcs relative to the existing infrastructure.

SUMMARY

According to a first broad aspect, the invention provides a computer-implemented method of designing a fiber optic network for a plurality of premises in a geographic area that has existing infrastructure, the method comprising:

electronically generating or receiving (whether from an external source or from an component of a single computing system) design outputs comprising geographic locations of nodes in the fiber optic network and arcs extending between the nodes, relative to at least elements of existing infrastructure used as geographic locations for the nodes and the arcs, the elements of the existing infrastructure being associated with characterizing data that characterizes the elements;

electronically receiving validation data corresponding to the elements of the existing infrastructure, the validation data being indicative of validity of the characterizing data;

electronically generating new design outputs by optimizing geographic locations of the nodes and the arcs in the fiber optic network using at least fiber optic network design inputs, existing infrastructure inputs and the validation data, wherein the fiber optic network design inputs comprise data indicative of a plurality of nodes in the fiber optic network and data indicative of arcs extending between the nodes in the fiber optic network based on allocated bandwidth for the premises in the geographic area, and the existing infrastructure inputs comprise data indicative of the existing infrastructure, and wherein the new design outputs comprise optimized geographic locations of the nodes and the arcs in the fiber optic network relative to the existing infrastructure; and electronically outputting the new design outputs.

The design outputs may comprise geographic locations of nodes in the fiber optic network and arcs extending between the nodes, relative to at least elements of existing infrastructure and potential new elements of infrastructure generated based on existing elements of infrastructure indicated by the existing infrastructure inputs and in accordance with infrastructure generation rules, the potential new elements of infrastructure being associated with characterizing data that characterizes the potential new elements.

The method may further comprise automatically generating potential new elements of infrastructure based on existing elements of infrastructure indicated by the existing infrastructure inputs and in accordance with infrastructure generation rules, the potential new elements of infrastructure being associated with characterizing data that characterizes the potential new elements. The method may include optimizing the geographic locations of the nodes and the arcs in the fiber optic network using at least the fiber optic network design inputs, the existing infrastructure inputs, the potential new elements of infrastructure and the validation data.

The method may further comprise performing optimization with respect to the fiber optic network design inputs and the existing infrastructure inputs using an optimization model. The optimization model may comprise a tree optimisation model wherein each tree is centred at one of the nodes and comprises one or more of the arcs connected thereto. The optimization model may further comprise a linear optimization function subject to any one of: i) linear constraints; ii) integer constraints; and iii) linear constraints and integer constraints.

In one embodiment, the method includes electronically generating the design outputs by optimizing geographic locations of the nodes and the arcs in the fiber optic network using at least the fiber optic network design inputs and the existing infrastructure inputs (and optionally potential new elements of infrastructure generated based on existing elements of infrastructure indicated by the existing infrastructure inputs and in accordance with infrastructure generation rules, the potential new elements of infrastructure being associated with characterizing data that characterizes the potential new elements). Generating the design outputs may involve using an optimization model; the optimization model may comprise a tree optimization model wherein each tree is centred at one of the nodes and comprises one or more of the arcs connected thereto, and/or a linear optimization function subject to any one of: i) linear constraints; ii) integer constraints; and iii) linear constraints and integer constraints.

In a particular embodiment, the method comprises at least once (though typically more than once):

(a) subsequently electronically receiving further validation data corresponding to elements of the existing infrastructure used as geographic locations for the nodes and the arcs in the new design outputs, for which elements validation data has not yet been received, the further validation data being indicative of validity of characterizing data that characterizes the elements, and augmenting the validation data with the further validation data; and (b) electronically generating still further design outputs by optimizing geographic locations of the nodes and the arcs in the fiber optic network using fiber optic network design inputs, existing infrastructure inputs and the validation data, wherein the still further design outputs comprise optimized geographic locations of the nodes and the arcs in the fiber optic network relative to the existing infrastructure.

The fiber optic network design inputs may further comprise data indicative of a plurality of arcs extending between the nodes and each of the premises. In this embodiment, i) each of the arcs may comprise at least one fiber optic cable; ii) the nodes may comprise Fiber Distribution Hubs (FDHs) or fiber optic cable splice locations; or iii) each of the arcs may comprise at least one fiber optic cable, the nodes comprising Fiber Distribution Hubs (FDHs) or fiber optic cable splice locations.

The existing infrastructure may comprise:

i) a power network, wherein the optimised geographic locations of the nodes comprises a plurality of power poles of the power network so that at least one fiber optic cable can be hung therebetween; and/or ii) a duct network having a plurality of pits and a plurality of existing ducts therein, wherein the optimised geographic locations of the nodes further comprise the plurality of pits of the duct network so that fiber optic cables can be laid in the existing ducts therebetween.

In one embodiment, the existing infrastructure comprises a duct network having a plurality of pits and a plurality of existing ducts therein, the optimised geographic locations of the nodes further comprise the plurality of pits of the duct network so that fiber optic cables can be laid in the existing ducts therebetween, and the optimised geographic locations of the arcs further comprise new ducts, not of the duct network, so that the fiber optic cables can be laid therein where the existing infrastructure cannot be used for the fiber optic network.

The fiber optic network design inputs may further comprise data indicative of costs.

The method may further comprise:

i) displaying the design of the fiber optic network with respect to a map of the geographic area using the design outputs; and/or ii) estimating the plurality of nodes and the arcs in the fiber optic network based on the allocated bandwidth for the premises in the geographic area.

In one embodiment, the existing infrastructure inputs comprise data indicative of a cost of inspecting elements of the existing infrastructure.

In one embodiment, generating the new design outputs includes constraining a cost of implementation of the new design outputs relative to a cost of implementation of the design outputs by a predefined amount.

This aspect also provides a computer software product, configured to control a computing device, when executed thereon, to implement the method described above.

The computer software product may be stored (in some cases in permanent form) on a computer-readable medium.

According to a second broad aspect, the invention provides a system for designing a fiber optic network for a plurality of premises in a geographic area that has existing infrastructure, the system comprising:

an input module arranged to electronically receive design outputs comprising geographic locations of nodes in the fiber optic network and arcs extending between the nodes, relative to at least elements of existing infrastructure used as geographic locations for the nodes and the arcs, the elements of the existing infrastructure being associated with characterizing data that characterizes the elements;

the input module being further arranged to electronically receive validation data corresponding to the elements of the existing infrastructure, the validation data being indicative of validity of the characterizing data;

an optimizer arranged to electronically generate new design outputs by optimizing geographic locations of the nodes and the arcs in the fiber optic network using at least fiber optic network design inputs, existing infrastructure inputs and the validation data, wherein the fiber optic network design inputs comprise data indicative of a plurality of nodes in the fiber optic network and data indicative of arcs extending between the nodes in the fiber optic network based on allocated bandwidth for the premises in the geographic area, and the existing infrastructure inputs comprise data indicative of the existing infrastructure, and wherein the new design outputs comprise optimized geographic locations of the nodes and the arcs in the fiber optic network relative to the existing infrastructure; and an output arranged to output the new design outputs.

The design outputs may comprise geographic locations of nodes in the fiber optic network and arcs extending between the nodes, relative to at least elements of existing infrastructure and potential new elements of infrastructure generated based on existing elements of infrastructure indicated by the existing infrastructure inputs and in accordance with infrastructure generation rules, the potential new elements of infrastructure being associated with characterizing data that characterizes the potential new elements.

In an embodiment, the system further comprises an infrastructure generator and infrastructure generation rules, wherein the infrastructure generator is configured to automatically generate potential new elements of infrastructure based on existing elements of infrastructure indicated by the existing infrastructure inputs and in accordance with infrastructure generation rules, the potential new elements of infrastructure being associated with characterizing data that characterizes the potential new elements. The optimizer may be arranged to optimize the geographic locations of the nodes and the arcs in the fiber optic network using at least the fiber optic network design inputs, the existing infrastructure inputs, the potential new elements of infrastructure and the validation data.

In one embodiment, the optimizer is arranged to perform optimization with respect to the fiber optic network design inputs and the existing infrastructure inputs using an optimization model. The optimization model may comprise a tree optimisation model wherein each tree is centred at one of the nodes and comprises one or more of the arcs connected thereto, and/or a linear optimization function subject to any one of: i) linear constraints; ii) integer constraints; and iii) linear constraints and integer constraints.

In another embodiment, the optimizer is arranged to generate the design outputs by optimizing geographic locations of the nodes and the arcs in the fiber optic network using at least the fiber optic network design inputs and the existing infrastructure inputs (and optionally potential new elements of infrastructure generated based on existing elements of infrastructure indicated by the existing infrastructure inputs and in accordance with infrastructure generation rules, the potential new elements of infrastructure being associated with characterizing data that characterizes the potential new elements). Generating the design outputs may involve using an optimization model. The optimization model may comprise a tree optimization model wherein each tree is centred at one of the nodes and comprises one or more of the arcs connected thereto, and/or a linear optimization function subject to any one of: i) linear constraints; ii) integer constraints; and iii) linear constraints and integer constraints.

In a particular embodiment, the system is configured to:

(a) receive further validation data corresponding to elements of the existing infrastructure used as geographic locations for the nodes and the arcs in the new design outputs, for which elements validation data has not yet been received, the further validation data being indicative of validity of characterizing data that characterizes the elements, and augment the validation data with the further validation data; and (b) generate still further design outputs by optimizing geographic locations of the nodes and the arcs in the fiber optic network using fiber optic network design inputs, existing infrastructure inputs and the validation data, wherein the still further design outputs comprise optimized geographic locations of the nodes and the arcs in the fiber optic network relative to the existing infrastructure.

The system may be controlled to perform steps (a) and (b) once, but commonly the system will be controlled to perform steps (a) and (b) a plurality of times.

In another embodiment, the existing infrastructure inputs comprise data indicative of a cost of inspecting elements of the existing infrastructure.

The system may comprise a cost monitor configured to control the optimizer so as to constrain a cost of implementation of the new design outputs relative to a cost of implementation of the design outputs by a predefined amount.

It should be noted that any of the various individual features of each of the above aspects of the invention, and any of the various individual features of the embodiments described herein including in the claims, can be combined as suitable and desired.

BRIEF DESCRIPTION OF THE DRAWINGS

In order that the invention can be more clearly ascertained, embodiments will now be described, by way of example, with reference to the accompanying drawings, in which.

DETAILED DESCRIPTION

Figure 1:
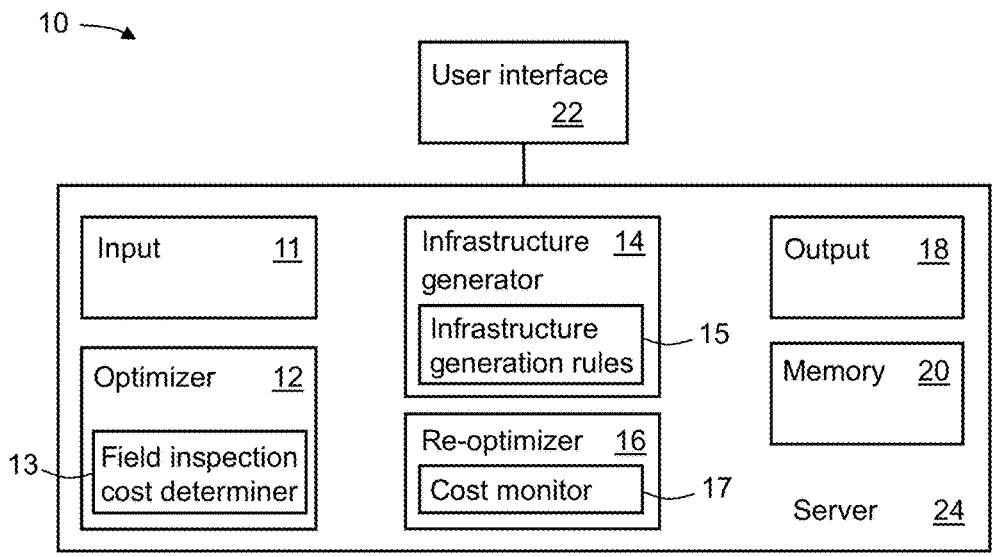
FIG. 1 is a schematic diagram of a system for designing a fiber optic network according to an embodiment of the present invention.

According to an embodiment of the present invention, there is provided a system 10, as shown schematically in FIG. 1, for designing a fiber optic network for a plurality of premises in a geographic area, such as a suburb, comprising existing infrastructure for utilities in the suburb, such as infrastructure for a power network. System 10 includes an input 11 arranged to receive fiber optic network design inputs comprising data indicative of a plurality of nodes in the fiber optic network and data indicative of a plurality of arcs extending between the nodes in the fiber optic network based on allocated bandwidth for premises in the suburb. The network design inputs include data indicative of costs (including of material and labour), so that the cost of any design generated by system 10 can be determined by system 10 as a part of the network design process, and minimized if desired.

Input 11 is also arranged to receive existing infrastructure design inputs comprising data indicative of the existing infrastructure that can be used as geographic locations for the nodes and arcs in the fiber optic network. System 10 further includes an optimizer 12 arranged to perform optimization with respect to the fiber optic network design inputs and the existing infrastructure design inputs to optimize the geographic locations of the nodes and the arcs and to generate design outputs comprising the optimized geographic locations of the nodes and arcs in the fiber optic network relative to the existing infrastructure; this may be done, for example, to minimize costs associated with construction of the fiber optic network.

System 10 includes an infrastructure generator 14. Infrastructure generator 14 is arranged to generate potential new elements of infrastructure for use in the generation of the design outputs by optimizer 12. It has been found that in some environments as little as 20% or less of the required infrastructure is available in the form of existing infrastructure, so the design outputs may include a significant and in some cases dominant number of new elements of infrastructure. It will commonly be advantageous, therefore, to optimize where the new elements of infrastructure are located.

During the generation of such design outputs, optimizer 12 will typically determine that the elements of existing infrastructure are insufficient to generate the design and that at least some new elements of infrastructure are required. Infrastructure generator 14 automatically generates potential new elements of infrastructure that would be suitable for completion of the design, based on existing elements of infrastructure (received as described above at input 11 as existing infrastructure design inputs) and infrastructure generation rules 15. Infrastructure generation rules 15 define the relationship between elements of existing infrastructure and possible new elements of infrastructure, according to the ability of the possible new elements to be supported or accommodated by—or otherwise co-exist with—elements of existing infrastructure.

For example, in general new ducts are most commonly required and readily installed along and under roads, so infrastructure generation rules 15 define that infrastructure generator 14, when generating potential new ducts, locate the potential new ducts accordingly, based on road locations and widths specified in the existing infrastructure design inputs. As a consequence, infrastructure generator 14 will generate a set of potential new ducts located in association with one or more roads, using the geometry of the roads' edges. In each case, the potential new ducts will resemble a ladder-like arrangement, with potential ducts along each side of the road and potential ducts crossing the road at regular intervals.

The potential new elements of infrastructure may be merged into the existing infrastructure inputs or otherwise made similarly accessible by optimizer 12, so that optimizer 12 will employ the potential new elements of infrastructure just as it would elements of existing infrastructure during the generation of the design. The costs associated with a potential new element of infrastructure, however, are typically significantly higher than the costs associated with a comparable element of existing infrastructure in the same (or essentially the same) location. This is because certain costs—such as those of the materials and/or labour required to construct or install the potential new elements—do not arise when using a comparable element of existing infrastructure. This generally encourages optimizer 12 to employ an element of existing infrastructure over a potential new element of infrastructure, all other considerations being equal.

In this embodiment, system 10 is configured to control infrastructure generator 14 to generate potential new elements of infrastructure each time a design is to be generated by optimizer 12, so that the generated potential new elements of infrastructure are available or use by optimizer 12. In another embodiment, the user may be given the ability to select whether or not system 10 employ infrastructure generator 14, or infrastructure generator 14 may be omitted. In still another embodiment, system 10 is configured not to automatically employ infrastructure generator 14 each time a design is to be generated, but instead in response to optimizer 12 determining that so high a number of new elements of infrastructure will be required that infrastructure generator 14 should be employed before optimizer 12 generates the ultimate design.

System 10 also includes a re-optimizer 16 arranged to permit a user to modify one or more design inputs or select one or more design constraints (or both) and to control system 10 to generate new design outputs according to the design inputs as modified and/or the selected one or more design constraints. Re-optimizer 16 includes a cost monitor 17 that facilitates the control of cost during such design modification, as described below.

System 10 has an output 18, a memory 20, and a user interface 22. Memory 20 stores a software product comprising instructions for the fiber optic network design method of this embodiment, including performing optimization and re-optimization using the fiber optic network design inputs, the existing infrastructure inputs and user inputs, to generate the design outputs for output via output 18 to a user. The user interface 22 is typically provided in or as a remote user computing device and various computer peripherals in communication with the other components of system 10 via a telecommunications network (not shown), such as the Internet or an Ethernet. Hence, the user typically receives any outputs remotely at user interface 22.

Output 18 is thus arranged to output the design outputs for design of the fiber optic network, for subsequent implementation. In this way, the nodes can be located at locations of existing infrastructure, such as power poles, and arcs of fiber optic cables hung therebetween. Alternatively, the design outputs output by output 18 may be checked against the existing infrastructure to verify that all the elements of the existing infrastructure exploited by the design outputs remain suitable for use in the fiber optic network (lest, for example, some have meanwhile deteriorated or become inaccessible). If some of the elements of the existing infrastructure exploited by the design outputs can no longer be used, or if for any reason it is desired that they not be used, a user may use re-optimizer 16 arranged to control system 10 generate new design outputs (as described below).

In the embodiment shown in FIG. 1, input 11, optimizer 12, infrastructure generator 14, re-optimizer 16, output 18 and memory 20 reside on a server 24, which may be in the form of a personal or other computer.

Figure 2:
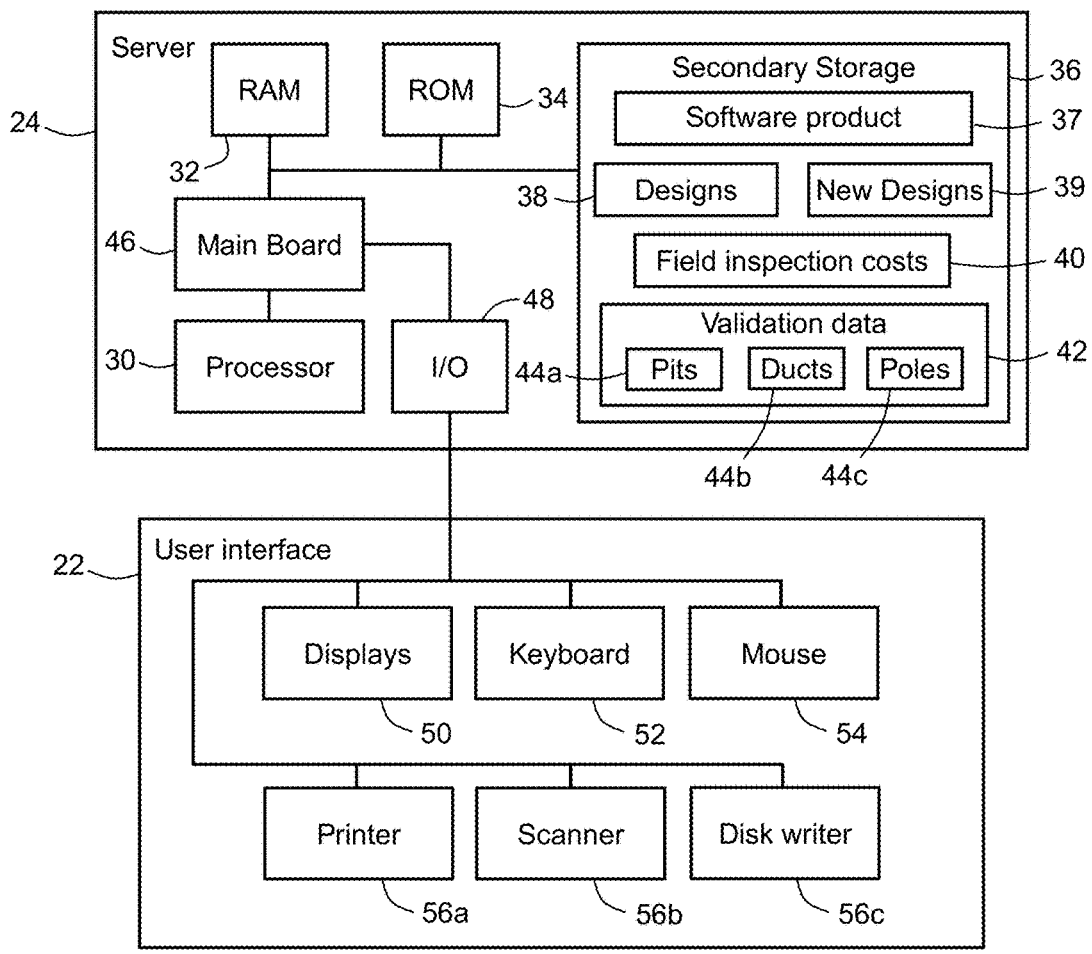
FIG. 2 is a schematic diagram of the system of FIG. 1.

FIG. 2 is a more detailed, schematic diagram of certain functional components of user interface 22 and server 24. Referring to FIG. 2, server 24 includes a processor 30 (or one or more processors) that accesses RAM 32, ROM 34 and various secondary data storage 36 such as hard disk drives. RAM 32, ROM 34 and secondary storage 36 together constitute memory 20. Secondary storage 36 includes the aforementioned software product 37. Processor 30 executes software product 37. In this embodiment, input 11, optimizer 12, re-optimizer 16 and output 18 of FIG. 1 are implemented by software product 37, utilizing various hardware components of server 24, as will be appreciated by those skilled in the art.

Software product 37 can update design outputs when desired network design inputs are varied by a user, typically in the form of a network designer. Software product 37 is also provided on an optical or magnetically readable medium, such as a CD-ROM 29, though it might also be provided in a ROM or other electronic circuit as firmware or provided over a distributed computer network such as the Internet. The software product 37 also includes instructions for the computational device 3 to implement the fiber optic network design method.

Server 24 also includes a main board 46 with interfacing circuitry, and an I/O board 48 (which may include a network support module, such as a LAN switch or Internet gateway). Main board 46 controls the flow of data and commands to and from user interface 22 via I/O 48. User interface 22 includes one or more displays 50, a keyboard 52, a computer mouse 54, and peripherals a printer 56*a* (for converting files, spreadsheets and maps into paper hardcopy), a scanner 56*b* (for converting documents into electronic file format), and an optical disk writer 56*c* (for writing files, spreadsheets and maps to removable optical disks).

Thus, in use, a network designer either estimates the desired locations of the nodes and arcs of the intended fiber optic network based on the allocated bandwidth for the premises and their location in the geographic area, or receives these locations from a government or utility GIS (geographic information system), or any combination of these. Next, the designer generates—using a suitable software module—the fiber optic network design input data based on these desired locations. The software module that generates the fiber optic network design input data may be provided in the aforementioned remote user computing device as a part of system 10, or in a separate computing device and imported into system 10 via user interface 22.

The user communicates the input data from user interface 22 to server 24. Input 11 receives the estimates along with data indicative of the existing infrastructure so that optimizer 12 can perform optimization on these inputs to generate a network design employing elements of the existing infrastructure, generally to minimize construction and/or material costs of the proposed network.

As described above, the arcs extend between the nodes and each of the premises so that each premise receives at least one optical fiber and each node of the network comprises a Fiber Distribution Hub (FDH) or a fiber optic cable splice location. In the example given below, the existing infrastructure is a power network. However, as described above, the system 200 can be applied to more than one utility network (e.g. a power network and telecommunications network) to generate a multi-layered network design reusing different types of existing infrastructure.

In the example, optimizer 12 performs optimization on the inputted estimated node and arc locations with respect to the location of power poles and underground ducts of the power network to minimize, for example, the need to dig new trenches for new ducts for the optic fiber cables. In this way, the nodes of the network can be located at the power poles or underground pits of the power network so that the arcs of fiber optic cable can be hung or laid therebetween.

Optimization is performed by optimizer 12 on the inputs using an optimization model in the form of, in this example, a tree optimisation model, whereby each tree has a FDH (Fiber Distribution Hub) centered at one of the nodes and one or more arcs connected thereto. This model can be expressed as a linear optimisation function subject to a number of linear and integer constraints, which is as follows:

$$\text{minimise } C^H \sum_{p \in H} z_p + C^S \sum_{p \in H} w_p + \sum_{a \in A, t \in T} C^A_{at} y_{at}$$

This is subject to constraints (1) to (4) as follows:

$$M^H z_p + \sum_{a, T_a = p} x_a \geq D_p + \sum_{a, F_a = p} x_a \quad \forall\, p \quad (1)$$

$$z_p + \sum_{t, a, T_a = p} y_{at} = 1 \quad \forall\, p, D_p > 0 \quad (2a)$$

$$\sum_{t, a, T_a = p} y_{at} \leq 1 \quad \forall\, p, D_p = 0 \quad (2b)$$

$$z_p d_p + w_p (d_p - 1) + \sum_{a, T_a = p} y_{at} \geq \sum_{a, F_a = p} y_{at} \quad \forall\, p, t \quad (3)$$

$$x_a \leq \sum_t M_t y_{at} \quad \forall\, a \quad (4)$$

The optimization model employed by optimizer 12 assumes the following:

A set of $N^P$ power poles P indexed by p (where the term pole and power pole are used interchangeably).

Each pole has a demand $D_p$—the number of fibers that are needed at this pole

A set of $N^A$ possible arcs A indexed by a, each going from pole $F_a$ to pole $T_a$. Each span will correspond to two arcs. The length of arc a is given by $l_a$ The degree of each pole, $d_p$—the number that start at (and end at) pole p The set H of poles which are potential FDH or splice locations. A splice location is a location where one cable can be joined to two other cables, usually a larger one into two smaller ones. Not all poles may be allowed to locate an FDH or a splice.

The fixed cost of an FDH=$C^H$.

A set of $N^T$ cable types T indexed by t. Each cable type has a maximum fiber capacity $M_t$. Each arc a has a known cost for being connected by cable type t=$C^A_{at}$. This is calculated from the type of arc, its length and the type of cable.

$M^H$ is the maximum fiber capacity for an FDH.

The above variables are defined as follows:

$z_p \in \{0,1\}$, which is 1 if pole p is used as an FDH. By definition $z_p=0$ if $p \notin H$.

$w_p \in \{0,1\}$, which is 1 if pole p is used as a splice location. By definition $w_p=0$ if $p \notin H$.

$y_{at} \in \{0,1\}$, which is 1 if arc a has a cable of type t installed.

$x_a$ which is the "fiber flow" on arc a. That is, the number of free fibers that will be available at the end pole.

Constraint (1) ensures that the "fiber flow" into a pole is at least as large as the demand at the pole plus the fiber flow out of the pole. For an FDH, "inwards fiber flow" is the capacity of the FDH ($M^H z_p$).

Constraint (2a) ensures that a pole with demand is either an FDH or it has exactly one cable connecting in to it. If a pole has no demand, it must have at most one cable connecting in to it (2b). These constraints, together with the preservation of cable types imposed by constraint (3), ensure that there is no branching in the distribution cable network, except at an FDH or a splice.

Constraint (3) ensures that for each pole the inflow of a particular cable type is at least as large as the outflow of that cable type, unless the pole is an FDH or a splice.

Constraint (4) ensures that the "fiber flow" on an arc is less than the maximum for the installed cable.

Thus, the optimisation function can be seen as minimizing the combined construction cost of installed FDHs and splices and the cost of installing cables between nodes and between nodes and premises by utilizing existing infrastructure where possible rather than, say, digging new trenches for the arcs of the network. The design outputs from the optimisation function can then applied to a map of the suburb for construction of the network.

In use, server 24—executing software product 37—receives design inputs from the fiber optic network designer as described above, such as with keyboard 52 and mouse 54, relating to the network design and the existing infrastructure. That is, the designer enters the inputs into software product 37, which is displayed on display 50. Optimizer 12 then performs the optimization model based on the inputs from the designer and produces design outputs relating to the network design, which are displayed on display 50 and stored in a file or files in secondary storage 36.

Software product 37 generates and displays various user interface screens on user interface 22. These user interface screens typically include various control buttons and network design parameters. The network design parameters include designer defined inputs for a given network design and generic network inputs (or parameters) for a network design, including the fiber optic network design inputs and the existing infrastructure design inputs, and design outputs as discussed below.

The designer defined inputs include a node domain set relating to feasible geographic location of nodes. In practice, these may be a set of usable power poles of the existing power infrastructure in the geography being modelled, or they may be a set of nodes representing street junction points or intersections. The designer defined inputs also include the number of fibers that have to be delivered to each node in the network design (e.g. demand) and an arc domain set relating to feasible geographic location of arcs, which can be used to connect nodes with cables of a specific type. In practice, the arc domain set can either be defined by the set of power poles that are connected by existing electrical infrastructure, or the pre-existing duct network which may be available for use, or they can represent the connection between nodes representing street junctions or intersections to host new trenched networks, or a combination thereof. Designer defined inputs further include a cable type domain set relating to feasible types of cable to be used in the network design, and an optimisation model parameter set for the optimisation model.

The generic network inputs include information relating to the minimum and maximum number of FDHs, the fiber capacity of each FDH (viz. the maximum number of fibers connect to an FDH), the maximum distance from an FDH to a node, the allowable consumable capacity of fibers in the allowable cable set, the entry point of the distribution cable into the area being planned, whether splicing is allowed, the number of fibers per tube in accordance with the reference architecture, whether or not the solution must include only trenched cable, or a combination of both trenched and aerial cable and network component costs.

The network component costs include the fixed cost of each FDH, splice enclosure costs, the fixed cost of an individual fiber splices and splice enclosure pits, aerial cable installation cost (per meter), trenching costs (per meter), hauling fiber through trenched ducts (cost per meter) and cable costs (per meter). The base data required is the location of nodes, the fiber demand for each node, and a determination of whether the node can act as an FDH or cable splice location. These data sets also have a number of spans or arcs—potential connection between nodes. Spans can be thought of as undirected potential arcs that may or may not be used in the output design. Each potential arc includes a determination of whether or not it can be used to string aerial cable only, run trenched cable only, or string both aerial and run trenched cable.

Design outputs include an output node set relating to optimised geographic location of FDHs and cable splice nodes in the network design and an output arc set relating to optimised use of arcs in the network design, including whether or not each arc is used to string aerial cable only, run new trenched cable only, utilize pre-existing duct capacity only, or both string aerial and run trenched cable (new or pre-existing). Also, the design outputs include the type of cable used and the utilized capacity in each specific cable.

Figure 3A:
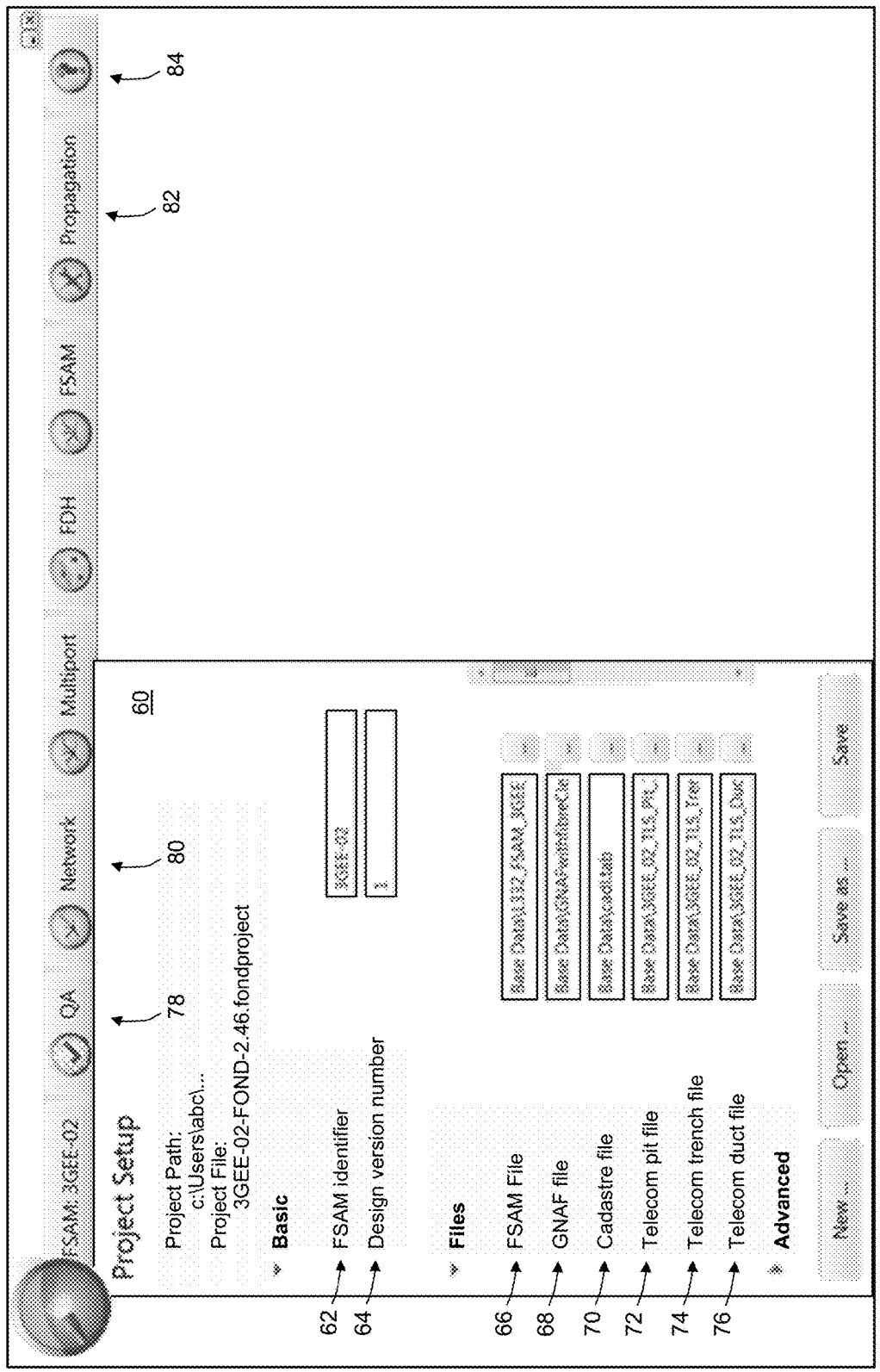
FIGS. 3A to 3C are examples of user interface screens generated by the software product of the system of FIGS. 1 and 2 according to an embodiment of the present invention.
Figure 3B:
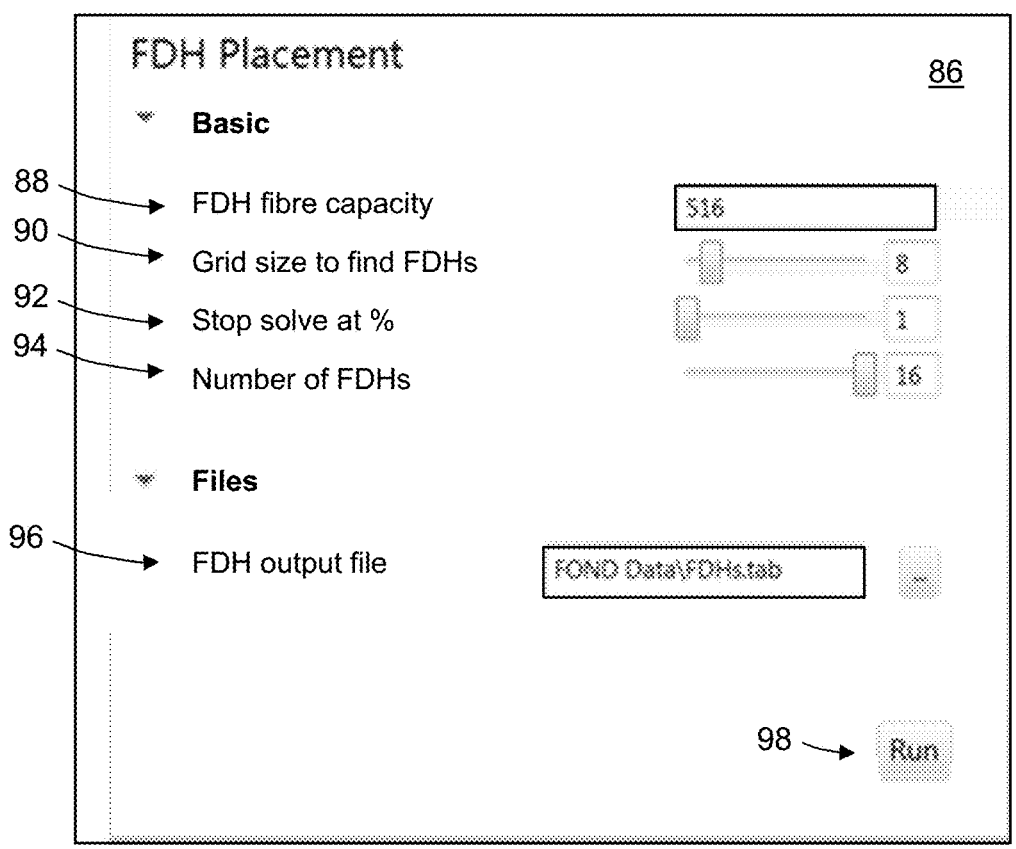
Figure 3C:
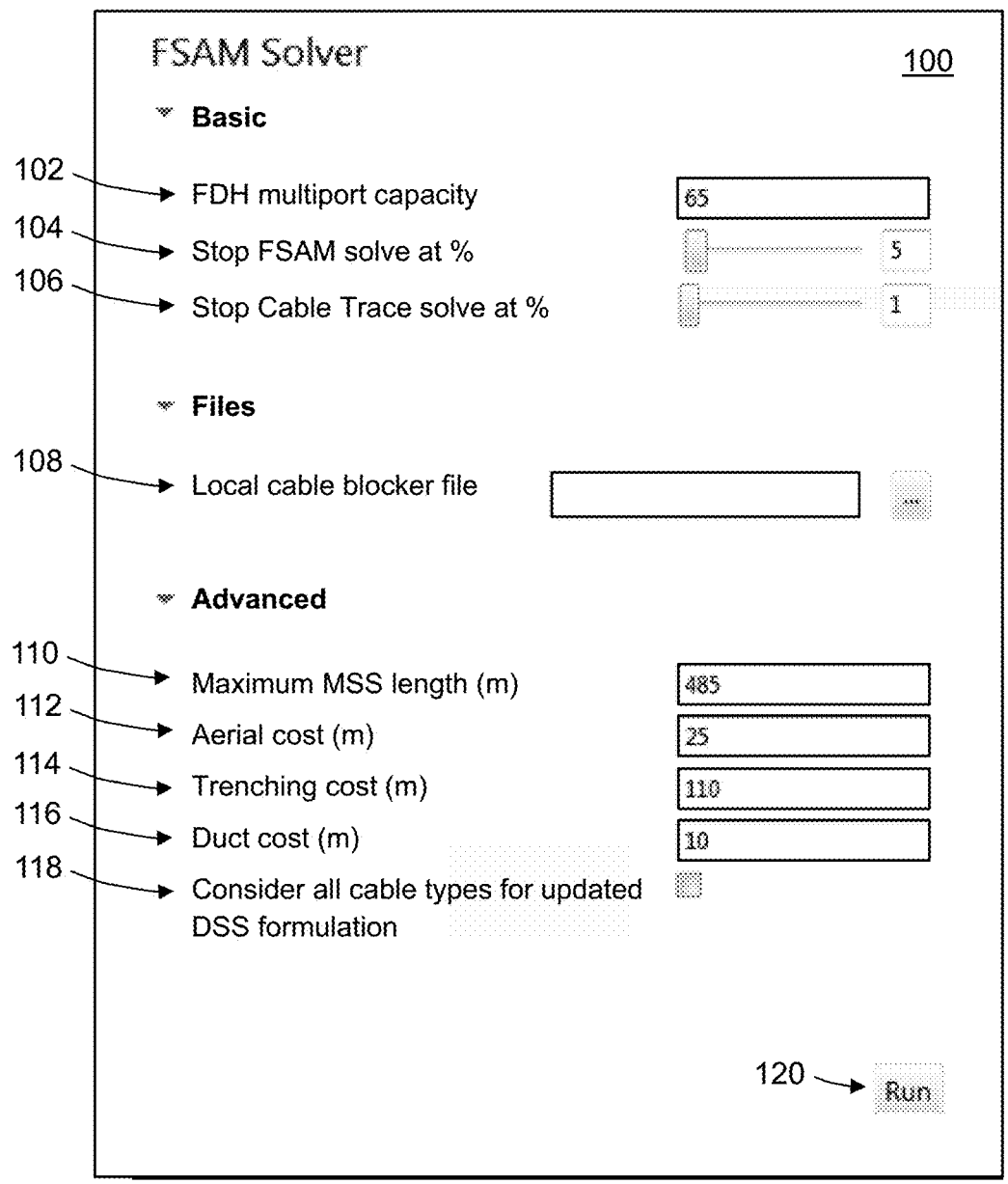

FIGS. 3A to 3C are examples of such user interface screens, arranged as tabs, as generated by software product 37 and displayed on user interface 22. These tabs are arranged to be consistent with and to enforce preferred workflow, and are generally followed by the user from left to right on user interface 22.

FIG. 3A is a view of a project setup tab 60 configured to allow the user to specify input files containing the name of the design 62 (labelled "FSAM identifier") for—in this example—a particular telecom, and the design's version number 64, and respective file selection buttons for selecting a fiber servicing area module (FSAM) file 66, a geocoded national address file (GNAF) 68, a cadastre file 70, a pit file 72 of the telecom, a trench file 74 of the telecom, and a duct file 76 of the telecom.

Also generated by software product 37 are a quality assurance (QA) tab 78, a Network tab 80 and a Propagation tab 82: these tabs are configured to allow the user either to prepare the input data (e.g. check the data for errors) or wrap the finished design for submission. A "?" tab 84 allows the user to request customer support.

FIG. 3B is a view of a FDH placement tab 86 including controls that allow the user to specify FDH fiber capacity (at 88), the grid size to be employed to find FDHs (at 90), the percentage at which optimizer 12 should stop (at 92), and the number of FDHs (at 94). The percentage at which optimizer 12 should stop, controlled by control 92, may be used to control optimizer 12 to halt before it determines an optimal solution. This functionality is provided because optimizer 12 may generate numerous permitted (or 'legal') but suboptimal solutions in the course of searching for the optimal solution. This percentage is enforced based on the theoretical optimality for the given inputs (which may be calculated by optimizer 12 before commencing its determination of a solution).

The location of the output file can be selected (at 96), and a Run button 98 is provided to control optimizer 12 to commence operation.

FIG. 3C is a view of a solver tab 100 with controls for allowing the user to specify FDH multiport capacity (at 102), the percentage at which optimizer 12 should stop (at 104), the percentage at which cable tracing should stop (at 106), the location of a local cable blocker file (at 108), the maximum MSS length in meters (at 110), aerial cable cost per meter (at 112), trenching cost per meter (114), duct cost per meter (116), and whether all cable types should be considered for updated Distribution Sheath Segment (DSS) formulation (at 118). A Run button 120 is again provided to control optimizer 12 to commence operation.

The cost optimisation model thus determines a suitable fiber optic network design with a minimum number of components to minimize cost. The design outputs are outputted by output 18 to a design file 38 (which, hence, stores the design and is synonymous with the design) in secondary storage 36. As is described below, design 38 may be modified by system 10 under certain circumstances, resulting in the generation of new design outputs by system 10; the new design outputs are outputted by output 18 to a design file 39 (which is synonymous with the new design) in secondary storage 36.

Figure 4:
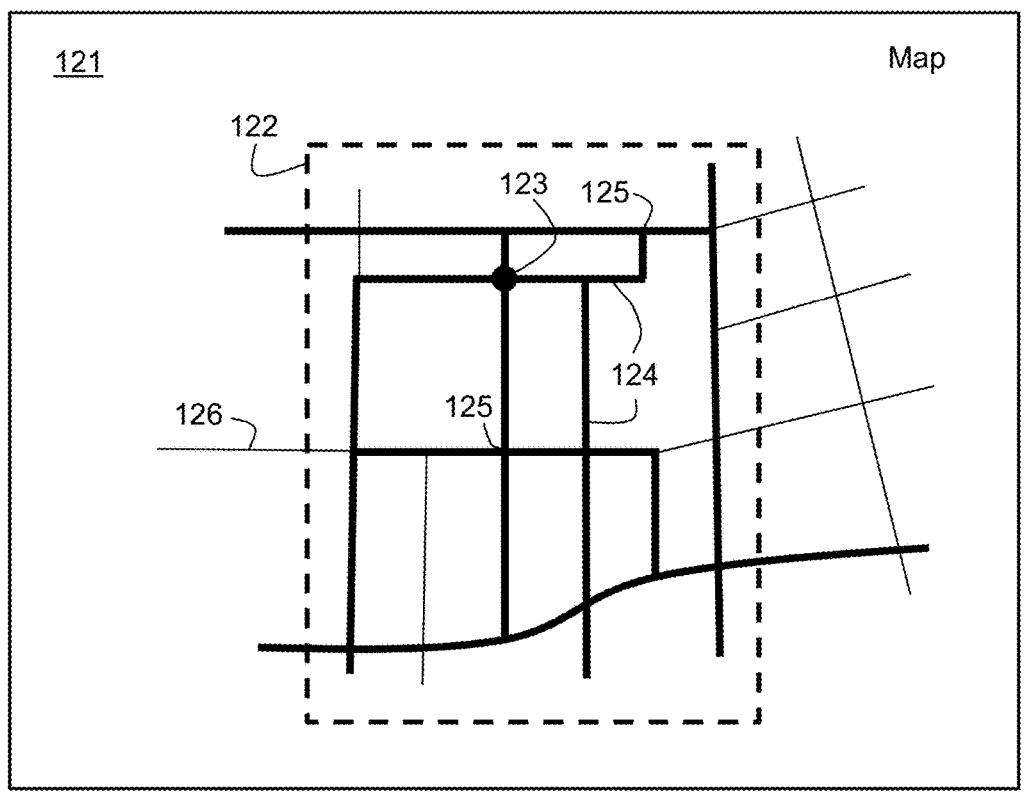
FIG. 4 is an exemplary map of a fiber optic network design produced by the system of FIGS. 1 and 2, the map being displayed using design outputs produced using the system of FIGS. 1 and 2.

System 10 may also be controlled to generate the design of the fiber optic network with respect to a map of the geographic area using the design outputs. This is generally done by inputting design 38 or 39 into an appropriate geospatial application of a display module (not shown) of server 24 and executed by processor 30. FIG. 4 is a schematic map 121 of a fiber optic network design produced by system 10, map 121 being displayed using design outputs produced using the user interface screens of FIGS. 3A to 3C and imported from design 38 or 39.

Referring to FIG. 4, the resulting fiber optic network design includes one or more disconnected 'trees' 122 each with cable branches extending from nodes located at street intersections. The exemplary tree 122 shown in FIG. 4 includes one FDH 123, which is the fiber connection node for cables 124 in the network. Also, splices 125 join two cables together to form a continuous optical waveguide. As described, tree 122 can only branch at nodes that are either an FDH 123 or splice 125 and the cable connection between nodes is achieved by stringing aerial cable, running trenched cable, or both stringing aerial and running trenched cable along an arc. In practice, there is a cost incurred for every arc and node in the network design depending on how the arc is used to connect the nodes at either end of the arc with cable 124. It will be seen that the design does not dictate that all of streets 126 have cable deployed therein. Also, it should be noted that arcs to individual premises are not shown in this example.

The network planning process is typically completed in two phases. The first is the production of a design, as described above, in which input data indicative of, for example, the location and capacity of pits and ducts, and the location and path of poles and other existing aerial network infrastructure. However, once the design outputs have been generated, and the design outs puts outputted (such as in the form of map 121), according to this embodiment, a second phase involving revision of the design is performed following a comparison between the initial design outputs and a field inspection.

In preparation for the second phase, the design outputs (in effect, the design generated by system 10) are validated in the field. This typically involves checking those elements of the existing infrastructure that are exploited by the design, in case one or more of those elements no longer exist, have changed or for any reason can no longer be used in the proposed network design.

For example, a design may propose to use a duct shown as empty in the original input data along the east side of a street, but subsequent field inspection might show that the duct is not empty. This may mean that the duct cannot be used, or cannot be used as extensively as proposed. Hence, this part of the original input data must be deemed incorrect.

Potential new elements of infrastructure generated by infrastructure generator 14 are also validated in the field, even though these elements do not at this point exist. A field inspector will typically inspect the site of a potential new element and accept or reject the proposed location. For example, in the course of the field inspection of a potential new element of infrastructure an inspector may check the suitability of the site based on the location of nearby driveways, the availability of space on a nature strip, and the presence or otherwise of utilities such as water, gas or buried power lines.

Once the designer has collected some or all of the validation information (pertaining both to elements of existing infrastructure and to potential new elements of infrastructure), the designer enters that data into system 10. The entry of such validation (including modification, as described below) information may be done in any convenient way. In this embodiment, this is done by importing into system 10 a file that identifies that identifies all elements in the design (that is, elements of existing infrastructure and potential new elements of infrastructure), each flagged as one of valid, invalid or unchecked. In other embodiment, this may be done by typing into system 10 information identifying the invalid (or valid or modified) elements, or by clicking with mouse 54 on the invalid (or valid or modified) elements as displayed, for example, as map 121 to prompt re-optimizer 16 to display a pop-up menu with options "validate", "invalidate" and "modify" for user selection. The most suitable approach may depend on—for example—whether most checked elements are likely to be found valid or most are likely to be found invalid. Each approach should result, however, in—at a minimum—all such elements employed in the design being flagged as "valid" or "invalid" (or "unchecked" if for some reason certain elements have not or could not be inspected), and optimally all elements of existing infrastructure input into the optimization process being flagged as "valid", "invalid" or "unchecked".

In another example, this is done using user interface 22, such as by interaction with a validation screen of re-optimizer 16. The designer may control system 10 to control re-optimizer 16 to open and read in the original design 38 or a previously generated new design 39 (stored, as described above, in secondary storage 36). Re-optimizer 16 may be arranged such that it can be controlled to prompt the designer for validation inputs. The validation inputs specify which of the elements of the existing infrastructure employed by the design are valid (that is, may be used in the design) and which are invalid.

In each case, once the validation information has been entered or system 10 provided with, for example, a file location indicative of the location of a file of validation information, re-optimizer 16 flags the elements that have been checked and found valid as "valid"), the elements that have been checked and found invalid as "invalid", and other elements as "unchecked".

Re-optimizer 16 allows the designer to modify the characteristics of elements of existing infrastructure used in original design 38. For example, field inspection may have revealed that the capacity of an element of existing infrastructure is greater or less than originally indicated. For example, if the element of existing infrastructure is a duct, field inspection may reveal that it empty when it was understood to be full, so its capacity is greater than originally indicated. On the other hand, if field inspection reveals that the duct is full when it was understood to be empty or only partially used, its capacity is less than originally indicated. Both increased and reduced capacity, but especially the latter, may necessitate modification of the original design 38. Such an amendment of the characteristics of an element is treated by re-optimizer 16 as the invalidating of the element, so re-optimizer 16 flags such an element as "invalid"), and the creation of a new element (or elements) having the characteristics ascertained during field inspection, which re-optimizer 16 flags as "valid". This allows such modifications to be handled within the validation framework.

The resulting validation data is stored—in this embodiment—in a validation data file 42. As discussed above, the information in validation data file 42 generally relates both to elements of the existing infrastructure and potential new elements of infrastructure. In this embodiment, validation data 42 comprises a set of field inspection files 44a, 44b, 44c, etc., each relating to a type of infrastructure element. In this example, pit field inspection information pertaining to pits is stored in field inspection file 44a, duct field inspection information pertaining to ducts is stored in field inspection file 44b, and pole field inspection information pertaining to poles is stored in field inspection file 44c.

At this point in the process, therefore, system 10 possesses the original infrastructure information and design inputs, the original design outputs (viz. design 38) and the validation data 42. In addition, optimizer 12 includes a field inspection cost determiner 13 for estimating the cost of field inspection, and re-optimizer 16 can control optimizer 12 to generate a new design in a manner than employs the estimated costs of field inspection. System 10 thus has, as fiber optic network design inputs, field inspection costs 40 (stored in secondary storage 36), in the form of data indicative of the cost of inspecting the types of element of infrastructure that are encountered or are likely to be encountered in generating the design. For example, the fiber optic network design inputs may include values for the cost of inspecting an existing trench, the cost of inspecting an existing pole, the cost of inspecting an existing duct, etc. Field inspection costs 40 also includes the cost of inspecting the sites of potential new elements of infrastructure generated by infrastructure generator 14 (as described above), and hence—for example—may include values for the cost of inspecting the proposed site of a potential new trench, the cost of inspecting a potential new pole, the cost of inspecting a potential new duct.

Field inspection cost determiner 13 uses field inspection costs 40 to estimate the actual cost of inspecting each element of existing infrastructure and each potential new element of infrastructure. For example, the cost of inspecting an existing trench may be specified in field inspection costs 40 as $x, such that generally the field inspection cost determiner 13 will assign a cost of $x to inspecting each of the existing trenches. However, field inspection cost determiner 13 is configured to take into account the geographic proximity of such elements of existing infrastructure, and it is arranged to assign a significantly lower cost estimate when a single field inspection can inspect a plurality of elements flagged with the default value "unchecked" in close proximity (i.e. such that they can readily be inspected in a single field inspection trip). For example, field inspection cost determiner 13 may assign a cost estimate of, say, $(x+n×0.1 x) to the cost of inspecting n existing trenches in close mutual proximity. Similarly, field inspection cost determiner 13 may assign an inspection cost of $(a+0.1 x)$, where $a is the cost of inspecting an existing pole, to the inspection of an existing pole flagged as "unchecked" and a nearby existing trench flagged as "unchecked".

Field inspection cost determiner 13 may be configured to estimate such costs on the basis of other factors, if desired, such as the distance of elements (existing or potential) from the construction office or the location of the inspectors. It should be noted, however, that in one variation optimizer 12 omits or does not employ field inspection cost determiner 13 in this manner, and instead uses field inspection costs 40 without reference to the proximity of "unchecked" elements of existing or potential infrastructure, or other factors.

In this embodiment, the cost of field inspection will generally not be taken into account when design 38 is generated. This is because every element of existing infrastructure and of generated potential new infrastructure will be "unchecked" during that initial generation, so there is expected to be generally little benefit in taking that cost into account until after a first round of field inspection has been conducted.

Optimizer 12 may thus generate the new design based on the fiber optic network design inputs, the costs determined by field inspection cost determiner 13 and the validation data. Costs determined by field inspection cost determiner 13 and the validation data allow optimizer 12 to take into account the cost of inspecting an "unchecked" element of existing or potential new infrastructure, and by implication the cost saving associated with using "valid" elements of existing or potential new infrastructure.

The designer can now control re-optimizer 16 to generate a new or modified design that achieves the original goals of the design inputs, but takes into account the fact that some of the elements of infrastructure used in the original design 38 are flagged as "invalid" and hence should not be used in the new design, and that some are "unchecked" so available for use but with an associated cost of field inspection. Re-optimizer 16 uses optimizer 12 to do so, including controlling optimizer 12 to enforce these two rules: 1) "invalid" elements of infrastructure must not be employed in the new design (as they have a 0% probability of being valid), and 2) "valid" elements of infrastructure should be preferred over "unchecked" elements of infrastructure, as valid elements have a 100% probability of being valid while unchecked elements have a probability of being valid that, even if high, will be less than 100% (which is why validation is required).

The new design may (and commonly will) include some elements of infrastructure that were not employed in original design 38 and remain flagged as "unchecked", and/or require new infrastructure elements not included in the potential new elements of infrastructure generated by infrastructure generator 14. Optimizer 12, under the control of re-optimizer 16, will tend to maximize the use of elements of existing infrastructure flagged as "valid", so optimizer 12 will 'shadow', so to speak, the original design 38 when generating a new design 39. This is for a number of reasons. Firstly, the use of unchecked elements of existing infrastructure necessarily entails a cost penalty (i.e. of field inspection) compared to the use of "valid" elements of existing infrastructure—and elements of existing infrastructure will generally be flagged as "valid" only if employed in the original (or at least a previous) design.

Secondly, "valid" potential new elements of infrastructure also do not require further field inspection so will be favoured to a degree, but in any event are generally situated close to existing infrastructure because infrastructure generation rules 15 are configured so that infrastructure generator 14 generates potential new elements of infrastructure where they can be conveniently—and hence economically—constructed or installed. Hence, although the use of potential new elements of infrastructure will involve procurement and/or installation costs, the favouring of "valid" potential new elements of infrastructure will also encourage the shadowing of the original design.

Thirdly, the creation of new elements of infrastructure not included in the potential new elements of infrastructure generated by infrastructure generator 14 will be least favoured, because the use of such elements includes procurement and/or installation costs and such elements, as they were not generated by infrastructure generator 14, will generally be located in less convenient locations than potential new elements of infrastructure generated by infrastructure generator 14.

Optionally, re-optimizer 16 is controllable by the designer to set a cost parameter that is used to specify what level of additional cost would excessively compromise cost optimization. The cost parameter has a default percentage value (e.g. 2%). In this variation, the cost of the new design as determined by optimizer 12 under the control of re-optimizer 16 is permitted to exceed the cost of the original design 38 by at most the percentage indicated by the cost parameter. When the designer controls re-optimizer 16 to generate the new design, of possible optimizer 12 will generate a new design using only the elements of existing infrastructure employed in the original design 38 flagged as "valid", owing to the additional cost of using unchecked elements or adding new infrastructure. Commonly, however, this will lead to a cost of the new design that is greater than the cost of the original design 38 by the value of the cost parameter. If optimizer 12 cannot find a solution that uses only elements of existing infrastructure employed in the original design 38 flagged as "valid" without leading to a cost that exceeds the original cost by more than the cost parameter, optimizer 12 will generate a design that additionally includes elements of existing infrastructure flagged as "unchecked" (generally because they were not employed in the original design 38) and/or that require the creation or installation of new trenches, ducts, poles, etc., without exceeding a cost that exceeds the original cost by more than the cost parameter. In any event, if optimizer 12 cannot find a solution subject to the cost parameter constraint, cost monitor 17 will control optimizer 12 to generate a design that optimizes cost even though exceeding the desired cost, on the basis of all available design inputs, field inspection costs 40 and validation data 42.

In each of these scenarios the use of elements flagged as "unchecked" and the creation of new elements of infrastructure entails a cost penalty (i.e. of field inspection and of procurement/installation, respectively) compared to the use of "valid" elements, so optimizer 12 will tend to maximize the use of elements of existing infrastructure flagged as "valid" and hence "shadow' the previous design when generating the new design.

The value of the cost parameter may be modified (generally increased) by the designer by suitably controlling re-optimizer 16. Decreasing the cost parameter will, in effect, encourage optimizer 12 to employ more elements of infrastructure that are flagged as "unchecked", and hence generally decrease the ratio of validated to invalidated elements of infrastructure, but this will be tempered by the cost associated with inspecting such "unchecked" elements. The lower the cost parameter, the closer will optimizer 12 be driven to perform cost optimization as before (corresponding to the use of the least labour and materials for construction), without reference to the cost of field inspection. Indeed, setting the cost parameter to zero controls cost monitor 17 to allow optimizer 12 to consider all elements of infrastructure irrespective of whether they have been inspected, because all new design options will necessarily exceed the cost of the previous design and hence do so by more than the cost parameter.

Increasing the cost parameter will increase the ability of optimizer 12 to find a solution that uses only elements of infrastructure flagged as "valid" (or at least increase the ratio of "valid" to "unchecked" elements of infrastructure). Setting the cost parameter very high will ultimately force optimizer 12 either to generate a design that uses only "valid" elements of infrastructure (cf. the scenario described above), or reach the conclusion that there is no feasible design that both satisfies the various design constraints and uses only "valid" elements of infrastructure.

Irrespective of the ultimate optimized design generated by system 10, the designer may select for use one of various new designs 39, taking into account considerations such as the cost of delaying the design process.

In this embodiment, optimizer 12, under the control of re-optimizer 16 as described above, will commonly make subtle changes across the entire design in order to achieve the desired optimization, including the adjustment of many elements and how they are employed in a manner whose benefit to the design overall would not be apparent to the designer.

Figure 5:
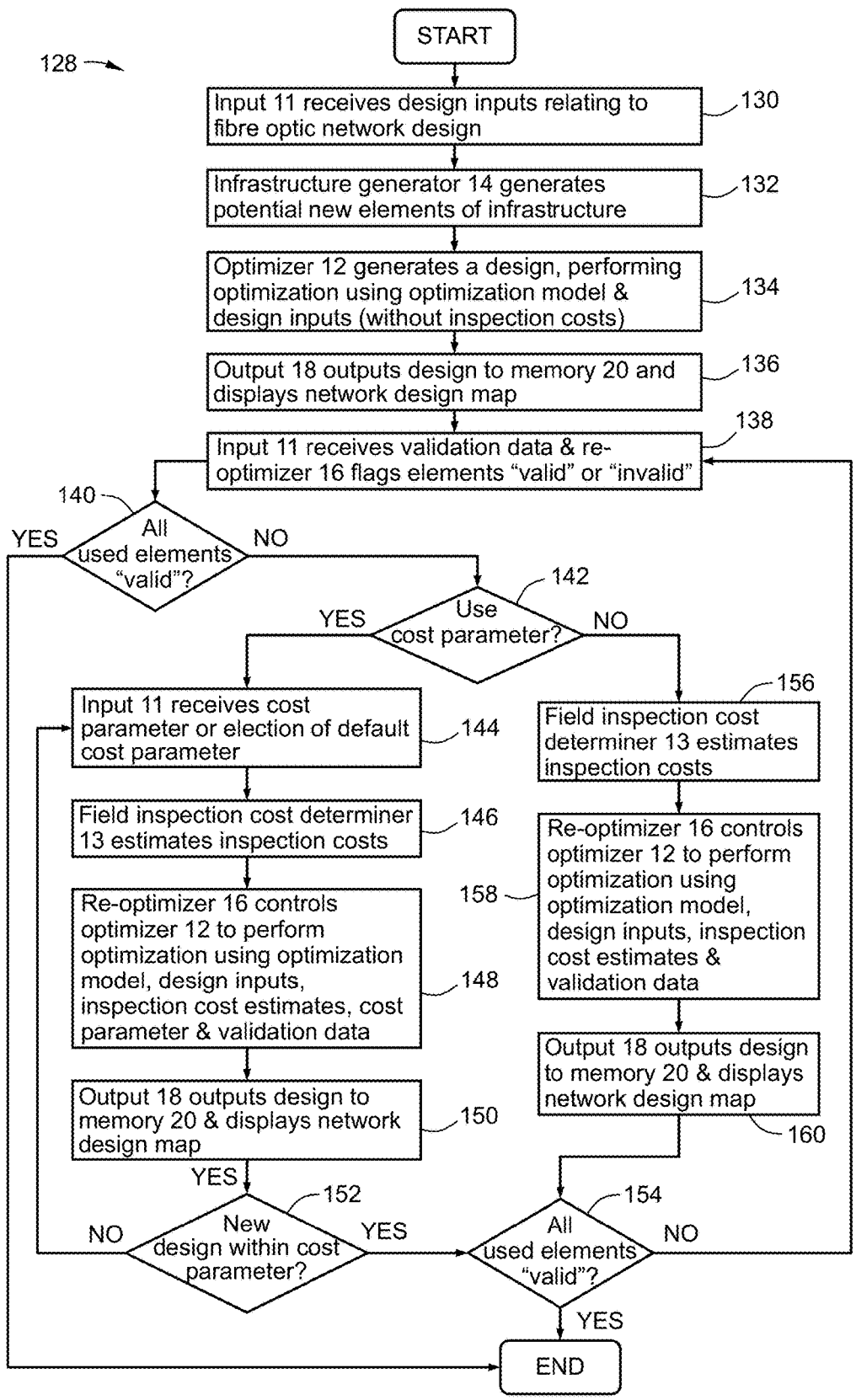
FIG. 5 is a flow diagram of a fiber optic network design method in accordance with an embodiment of the present invention.

In use, the fiber optic network design shown in FIG. 4 is obtained using the method of designing an optical fiber network shown as a flow diagram 128 in FIG. 5. Referring to FIG. 5, at step 130 input 11 of software product 37 receives design inputs relating to fiber optic network design including sets of feasible node and arc locations based on, for example, bandwidth allocation for premises in the suburb and existing infrastructure information. At step 132, infrastructure generator 14 generates potential new elements of infrastructure based on the existing elements of infrastructure according to infrastructure generation rules 15, for use as design inputs.

At step 134, optimizer 12 generates a design including performing optimization using the optimization model and the design inputs, the latter including existing infrastructure design inputs and the potential new elements of infrastructure (but without inspection costs).

At step 136, output 18 outputs the resulting design outputs to memory 20 (as original design 38), and displays a map of the fiber optic network design using the optimized outputs. At step 138, input 11 receives the validation data (pertaining both to elements of existing infrastructure and to the potential new elements of infrastructure) and re-optimizer 16: (i) flags as "valid" those elements found to match their original specification and those that have been modified (and hence invalidated and replaced with a new "valid" element) such that, as modified, they are adequate for performing the role specified for that element in the design 38, and (ii) flags as "invalid" those elements found not to match their original specification. All other elements are left unchanged (viz. typically with the default flag of "unchecked").

At step 140, re-optimizer 16 determines whether all of the elements used in the design are flagged as "valid". If all these elements are found to be flagged as "valid", processing ends. If not, processing continues at step 142, where cost monitor 17 of re-optimizer 16 determines whether the designer has controlled system 10 to use a cost parameter (or alternatively prompts the designer to indicate whether he or she wishes to continue with the use of a cost parameter). If a cost parameter is to be used, processing continues at step 144, where input 11 receives user input indicative of a value of the cost parameter or an election to use the default value of the cost parameter. At step 146, field inspection cost determiner 13 estimates inspection costs from the inspection cost input data, and at step 148 re-optimizer 16 controls optimizer 12 to generate a new design including performing optimization using the optimization model, the design inputs, inspection cost estimates, the cost parameter and the validation data. At step 150, output 18 outputs the resulting design outputs to memory 20 (as new design 39) and displays a map of the fiber optic network design using the new optimized outputs. The original design is retained in 38, and its cost is retained for use in subsequent cost comparisons.

At step 152, cost monitor 17 of re-optimizer 16 determines whether the cost of the new design satisfies the cost limit imposed by the cost parameter, using the cost parameter and the cost of the initial or original design. If so, processing continues at step 154, where re-optimizer 16 determines whether all of the elements of infrastructure used in generating the new design are flagged as "valid". If so, processing ends. Otherwise, processing returns to step 138. If, at step 152, cost monitor 17 of re-optimizer 16 determines that the cost of the new design does not satisfy the cost limit imposed by the cost parameter, processing returns to step 144, where the designer can select a new cost parameter.

If, at step 142, cost monitor 17 of re-optimizer 16 determines that the designer has controlled system 10 not to use a cost parameter (or alternatively the designer has responded negatively to a prompt by cost monitor 17 asking whether he or she wishes to continue with the use of a cost parameter), processing continues at step 156 where field inspection cost determiner 13 estimates inspection costs from the inspection cost input data. At step 158 re-optimizer 16 controls optimizer 12 to generate a new design including performing optimization using the optimization model, the design inputs (including the fiber optic network design inputs, the existing infrastructure design inputs and the potential new elements of infrastructure), inspection cost estimates and the validation data. At step 160, output 18 outputs the resulting design outputs to memory 20 (as new design 39) and displays a map of the fiber optic network design using the new optimized outputs. Processing then continues at step 154, as described above.

Ultimately, once the cost of the new design is found to satisfy the cost limit imposed by the cost parameter (at step 154) or a cost parameter is not used, and all elements used in the new design are flagged as "valid" (at step 154), processing ends.

Figure 6:
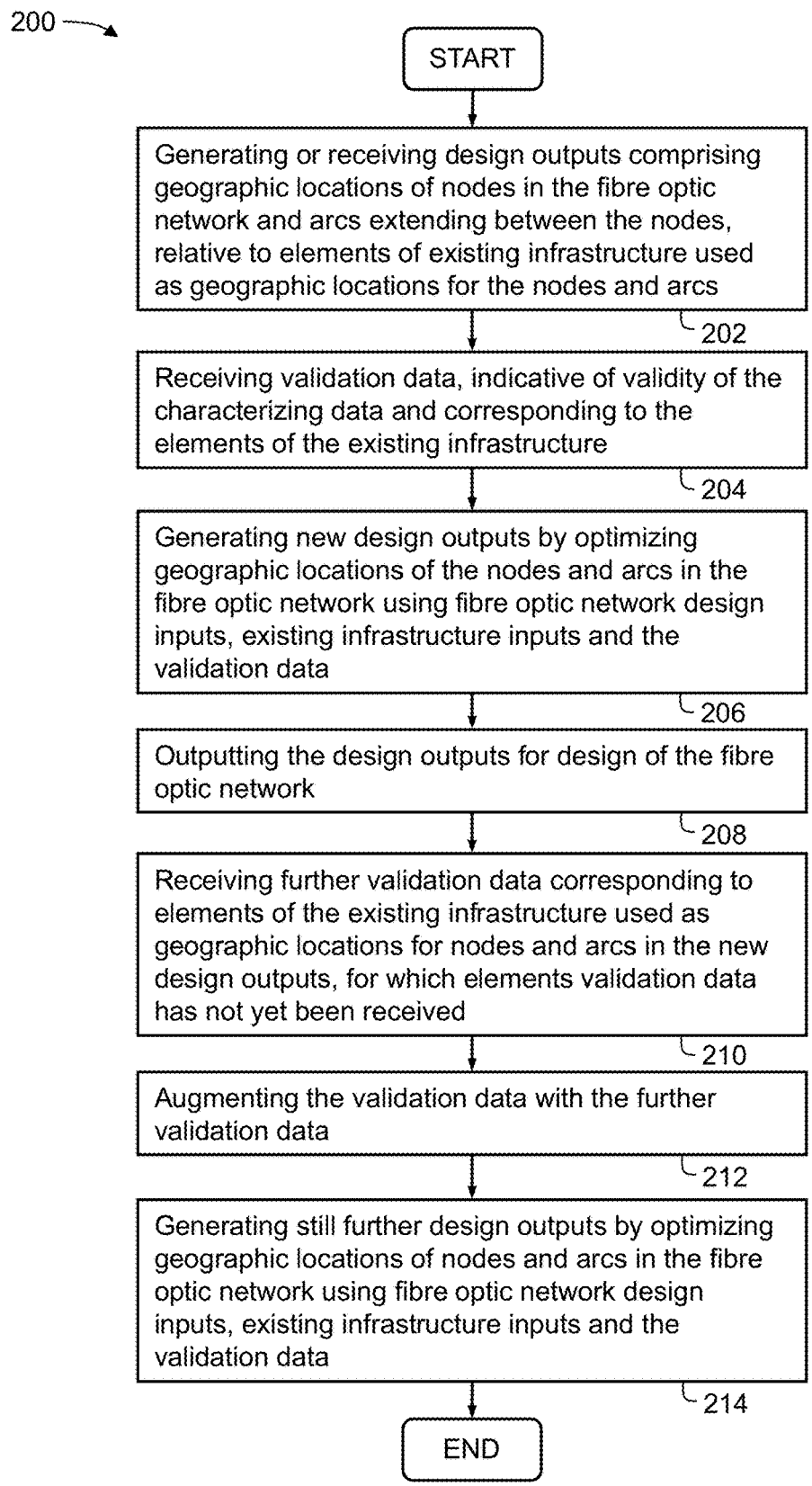
FIG. 6 is a flow diagram of an embodiment of the present invention.

FIG. 6 is a flow diagram 200 that summarizes a method of designing a fiber optic network for a plurality of premises in a geographic area according to this embodiment. The method includes, at step 202, electronically generating or receiving (whether from an external source or from an component of a single computing system) a design 38 in the form of design outputs comprising geographic locations of nodes in the fiber optic network and arcs extending between the nodes, relative to elements of existing infrastructure and potential new elements of infrastructure (if any) used as geographic locations for the nodes and the arcs. The elements of the existing infrastructure and the potential new elements of infrastructure are associated with characterizing data that characterizes the respective elements. At step 204, the method includes electronically receiving validation data corresponding to the elements of the existing infrastructure and the potential new elements of infrastructure, the validation data being indicative of validity of the characterizing data and hence of the various elements, and at step 206, electronically generating new design outputs by optimizing geographic locations of the nodes and the arcs in the fiber optic network using the design inputs (including the fiber optic network design inputs, the existing infrastructure design inputs and the potential new elements of infrastructure) and the validation data. The fiber optic network design inputs comprise data indicative of a plurality of nodes in the fiber optic network and data indicative of arcs extending between the nodes in the fiber optic network based on allocated bandwidth for the premises in the geographic area, the existing infrastructure design inputs are in the form of data indicative of the existing infrastructure and the potential new elements of infrastructure are in the form of data indicative of the potential new elements of infrastructure as generated by infrastructure generator 14; the new design outputs comprise optimized geographic locations of the nodes and the arcs in the fiber optic network relative to the existing infrastructure. At step 208, the method includes electronically outputting the new design outputs.

At step 210 of this embodiment, the method includes electronically receiving further validation data corresponding to elements of the existing infrastructure used as geographic locations for the nodes and the arcs in the new design outputs, for which elements validation data has not yet been received, the further validation data being indicative of validity of characterizing data that characterizes the elements, and at step 212, augmenting the validation data with the further validation data. At step 214, the method includes electronically generating still further design outputs by optimizing geographic locations of the nodes and the arcs in the fiber optic network using fiber optic network design inputs, existing infrastructure inputs and the validation data; the still further design outputs comprise optimized geographic locations of the nodes and the arcs in the fiber optic network relative to the existing infrastructure.

Figure 7:
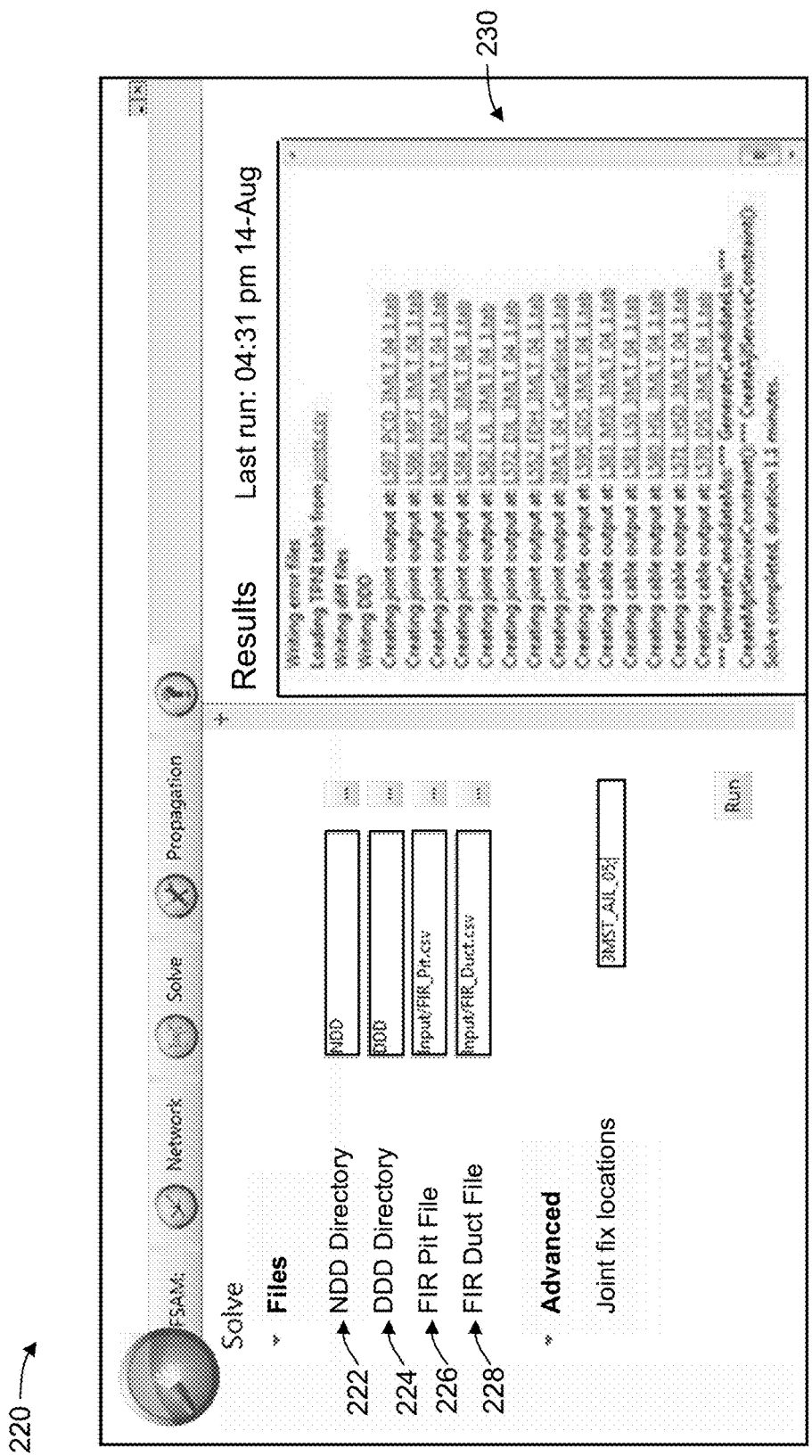
FIG. 7 is an exemplary user interface screen generated by the re-optimizer of the network design software product of the system of FIGS. 1 and 2, showing exemplary inputs and a progress panel, according to the embodiment of the present invention.

FIG. 7 is an exemplary user interface screen 220 of software product 37 of system 10, showing exemplary inputs 222 to 228 and a progress panel 230, according to the embodiment of the present invention. The inputs 222 to 228 are respectively: the memory location 222 of the original design 38, the memory location 224 to which the new design 39 is to be saved, the memory location 226 of the pit field inspection file 44*a* (containing the results of the field inspection of pits) and the memory location 228 of the duct field inspection file 44*b* (containing the results of the field inspection of ducts). Inputs 222 to 228 allow the user to control where the original design, the new design, the field inspection file for pits and the field inspection file for ducts are to be stored by software product 37.

Further aspects of the method will be apparent from the above description of system 10 and variations thereof. Persons skilled in the art will appreciate that the method could be embodied in program code, executed by a processor, which could be supplied in a number of ways, for example on a computer readable medium, such as a disc or a memory, or as a data signal, such as by transmitting it from a server. Persons skilled in the art will also appreciate that program code provides a series of instructions to implement the method.

It will also be understood to those persons skilled in the art of the invention that many modifications may be made without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will also be understood that the reference to any prior art in this specification is not, and should not be taken as an acknowledgement or any form of suggestion that the prior art forms part of the common general knowledge in any country.

The invention claimed is:

1. A computer-implemented method of designing a fiber optic network for a plurality of premises in a geographic area that has existing infrastructure, the method comprising:
    electronically generating or receiving design outputs comprising geographic locations of nodes in the fiber optic network and arcs extending between the nodes, relative to at least elements of existing infrastructure used as geographic locations for the nodes and the arcs, the elements of the existing infrastructure being associated with characterizing data that characterizes the elements of existing infrastructure;
    electronically receiving validation data corresponding to the elements of the existing infrastructure, the validation data being indicative of validity of the characterizing data;
    electronically generating new design outputs by optimizing geographic locations of the nodes and the arcs in the fiber optic network using at least fiber optic network design inputs, existing infrastructure inputs and the validation data, wherein the fiber optic network design inputs comprise data indicative of a plurality of nodes in the fiber optic network and data indicative of arcs extending between the nodes in the fiber optic network based on allocated bandwidth for the premises in the geographic area, and the existing infrastructure inputs comprise data indicative of the existing infrastructure, and wherein the new design outputs comprise optimized geographic locations of the nodes and the arcs in the fiber optic network relative to the existing infrastructure; and
    electronically outputting the new design outputs.

2. The method of claim 1, wherein the design outputs comprise geographic locations of nodes in the fiber optic network and arcs extending between the nodes, relative to at least elements of existing infrastructure and potential new elements of infrastructure generated based on existing elements of infrastructure indicated by the existing infrastructure inputs and in accordance with infrastructure generation rules, the potential new elements of infrastructure being associated with characterizing data that characterizes the potential new elements.

3. The method of claim 1 further comprising automatically generating potential new elements of infrastructure based on existing elements of infrastructure indicated by the existing infrastructure inputs and in accordance with infrastructure generation rules, the potential new elements of infrastructure being associated with characterizing data that characterizes the potential new elements.

4. The method of claim 3 including optimizing the geographic locations of the nodes and the arcs in the fiber optic network using at least the fiber optic network design inputs, the existing infrastructure inputs, the potential new elements of infrastructure and the validation data.

5. The method of claim 1 including optimizing the geographic locations of the nodes and the arcs in the fiber optic network using an optimization model.

6. The method of claim 5, wherein the optimization model comprises a tree optimisation model wherein each tree is centred at one of the nodes and comprises one or more of the arcs connected thereto.

7. The method of claim 5, wherein the optimization model further comprises a linear optimization function subject to any one of (a) linear constraints, (b) integer constraints, and (c) linear constraints and integer constraints.

8. The method of claim 1, including electronically generating the design outputs.

9. The method of claim 8, wherein generating the design outputs involves using a tree optimization model wherein each tree is centred at one of the nodes and comprises one or more of the arcs connected thereto.

10. The method of claim 9, wherein the tree optimization model further comprises a linear optimization function subject to any one of (a) linear constraints, (b) integer constraints, and (c) linear constraints and integer constraints.

11. The method of claim 1 comprising at least once:
   a. subsequently electronically receiving further validation data corresponding to elements of the existing infrastructure used as geographic locations for the nodes and the arcs in the new design outputs, for which elements validation data has not yet been received, the further validation data being indicative of validity of characterizing data that characterizes the elements, and augmenting the validation data with the further validation data; and
   b. electronically generating still further design outputs by optimizing geographic locations of the nodes and the arcs in the fiber optic network using fiber optic network design inputs, existing infrastructure inputs and the validation data, wherein the still further design outputs comprise optimized geographic locations of the nodes and the arcs in the fiber optic network relative to the existing infrastructure.

12. The method of claim 1 wherein the fiber optic network design inputs further comprise data indicative of a plurality of arcs extending between the nodes and each of the premises; and wherein:
   a. each of the arcs comprises at least one fiber optic cable;
   b. the nodes comprise Fiber Distribution Hubs (FDHs) or fiber optic cable splice locations; or
   c. each of the arcs comprises at least one fiber optic cable and the nodes comprise Fiber Distribution Hubs (FDHs) or fiber optic cable splice locations.

13. The method of claim 1, wherein the existing infrastructure inputs comprise data indicative of a cost of inspecting elements of the existing infrastructure.

14. The method of claim 1, wherein generating the new design outputs includes constraining a cost of implementation of the new design outputs relative to a cost of implementation of the design outputs by a predefined amount.

15. A system for designing a fiber optic network for a plurality of premises in a geographic area that has existing infrastructure, the system comprising:
   an input arranged to electronically receive design outputs comprising geographic locations of nodes in the fiber optic network and arcs extending between the nodes, relative to at least elements of existing infrastructure used as geographic locations for the nodes and the arcs, the elements of the existing infrastructure being associated with characterizing data that characterizes the elements of existing infrastructure;
   the input being further arranged to electronically receive validation data corresponding to the elements of the existing infrastructure, the validation data being indicative of validity of the characterizing data;
   an optimizer arranged to electronically generate new design outputs by optimizing geographic locations of the nodes and the arcs in the fiber optic network using at least fiber optic network design inputs, existing infrastructure inputs and the validation data, wherein the fiber optic network design inputs comprise data indicative of a plurality of nodes in the fiber optic network and data indicative of arcs extending between the nodes in the fiber optic network based on allocated bandwidth for the premises in the geographic area, and the existing infrastructure inputs comprise data indicative of the existing infrastructure, and wherein the new design outputs comprise optimized geographic locations of the nodes and the arcs in the fiber optic network relative to the existing infrastructure; and
   an output arranged to output the new design outputs.

16. The system of claim 15, wherein the design outputs comprise geographic locations of nodes in the fiber optic network and arcs extending between the nodes, relative to at least elements of existing infrastructure and potential new elements of infrastructure generated based on existing elements of infrastructure indicated by the existing infrastructure inputs and in accordance with infrastructure generation rules, the potential new elements of infrastructure being associated with characterizing data that characterizes the potential new elements.

17. The system of claim 15 further comprising an infrastructure generator and infrastructure generation rules, wherein the infrastructure generator is configured to automatically generate potential new elements of infrastructure based on existing elements of infrastructure indicated by the existing infrastructure inputs and in accordance with infrastructure generation rules, the potential new elements of infrastructure being associated with characterizing data that characterizes the potential new elements.

18. The system of claim 17 wherein the optimizer is arranged to optimize the geographic locations of the nodes and the arcs in the fiber optic network using at least the fiber optic network design inputs, the existing infrastructure inputs, the potential new elements of infrastructure and the validation data.

19. The system of claim 15 wherein the optimizer is arranged to perform optimization with respect to the fiber optic network design inputs and the existing infrastructure inputs using an optimization model.

20. The system of claim 15 configured to:
   a. receive further validation data corresponding to elements of the existing infrastructure used as geographic locations for the nodes and the arcs in the new design outputs, for which elements validation data has not yet been received, the further validation data being indicative of validity of characterizing data that characterizes the elements, and augment the validation data with the further validation data; and
   b. generate still further design outputs by optimizing geographic locations of the nodes and the arcs in the fiber optic network using fiber optic network design inputs, existing infrastructure inputs and the validation data, wherein the still further design outputs comprise optimized geographic locations of the nodes and the arcs in the fiber optic network relative to the existing infrastructure.

21. The system of claim 15 comprising a cost monitor configured to control the optimizer so as to constrain a cost of implementation of the new design outputs relative to a cost of implementation of the design outputs by a predefined amount.

22. A non-transitory computer-readable medium comprising a computer software product, the computer program product being configured to control a computing device, when executed thereon, to implement a method of designing a fibre optic network for a plurality of premises in a geographic area that has existing infrastructure, the method comprising:

electronically generating or receiving design outputs comprising geographic locations of nodes in the fibre optic network and arcs extending between said nodes, relative to at least elements of existing infrastructure used as geographic locations for said nodes and said arcs, said elements of the existing infrastructure being associated with characterizing data that characterizes the elements of existing infrastructure;

electronically receiving validation data corresponding to the elements of the existing infrastructure, said validation data being indicative of validity of the characterizing data;

electronically generating new design outputs by optimizing geographic locations of said nodes and said arcs in the fibre optic network using at least fibre optic network design inputs, existing infrastructure inputs and the validation data, wherein said fibre optic network design inputs comprise data indicative of a plurality of nodes in the fibre optic network and data indicative of arcs extending between said nodes in the fibre optic network based on allocated bandwidth for said premises in the geographic area, and said existing infrastructure inputs comprise data indicative of said existing infrastructure, and wherein said new design outputs comprise optimized geographic locations of said nodes and said arcs in the fibre optic network relative to the existing infrastructure; and electronically outputting the new design outputs.

\* \* \* \* \*